United States Patent [19]

Gleason

[11] Patent Number: 4,801,226
[45] Date of Patent: Jan. 31, 1989

[54] CRANKSHAFT BROACHING MACHINE AND METHOD

[75] Inventor: Patrick J. Gleason, Lum, Mich.

[73] Assignee: Turn-Broach, Inc., Lum, Mich.

[21] Appl. No.: 93,084

[22] Filed: Aug. 28, 1987

Related U.S. Application Data

[63] Continuation of Ser. No. 4,264, Jan. 9, 1987, abandoned, which is a continuation of Ser. No. 627,360, Jul. 3, 1984, abandoned.

[51] Int. Cl.$^4$ .................... B23D 37/06; B23B 5/18
[52] U.S. Cl. ........................................ 409/244; 29/6; 82/1 C; 82/9; 198/345; 384/12; 407/15; 407/18; 409/247; 409/252; 409/267; 409/269; 409/281
[58] Field of Search .................... 29/6, 38 E; 82/1 C, 82/9; 198/345; 384/12; 407/13, 15, 18, 19; 409/243, 244, 247, 250-252, 256, 257, 264-271, 273, 274, 276-278, 280, 281, 286, 287

[56] References Cited

U.S. PATENT DOCUMENTS

| | | | |
|---|---|---|---|
| 137,769 | 4/1873 | Forrest | 407/15 |
| 920,420 | 5/1909 | Bogert | 82/9 |
| 1,359,831 | 11/1920 | Oakley | 407/15 X |
| 2,039,480 | 5/1936 | Floeter | 82/2 R |
| 2,090,119 | 8/1937 | Groene et al. | 409/268 |
| 2,126,462 | 8/1938 | Groene et al. | 82/3 |
| 2,280,229 | 4/1942 | Groene et al. | 409/268 X |
| 2,280,230 | 4/1942 | Groene | 82/9 X |
| 2,282,720 | 5/1942 | Groene et al. | 409/263 |
| 2,553,966 | 5/1951 | Groene | 409/244 |
| 2,623,429 | 12/1952 | Meyer et al. | 82/9 X |
| 4,243,343 | 1/1981 | Clapp et al. | 407/15 |
| 4,275,983 | 6/1981 | Bergman | 198/345 X |
| 4,380,939 | 4/1983 | Gardner | 198/345 X |
| 4,653,158 | 3/1987 | Oeming | 29/6 |

FOREIGN PATENT DOCUMENTS

| | | | |
|---|---|---|---|
| 150165 | 8/1981 | German Democratic Rep. | 409/243 |
| 230535 | 4/1944 | Switzerland . | |
| 438242 | 11/1935 | United Kingdom . | |
| 2099736 | 12/1982 | United Kingdom | 409/243 |

OTHER PUBLICATIONS

Horace E. Linsley, *Broaching: Tooling and Practice,* The Industrial Press (New York, 1961), p. 152.

Primary Examiner—Gil Weidenfeld
Assistant Examiner—Steven C. Bishop
Attorney, Agent, or Firm—Barnes, Kisselle, Raisch, Choate, Whittemore & Hulbert

[57] ABSTRACT

A broaching machine and method for machining main bearings and crankpin bearings on a crankshaft for an automotive engine wherein a plurality of removable cutting tool inserts are arranged on a horizontally reciprocating slide below a rotating crankshaft to machine a plurality of bearings and distribute machining forces over the machining operation during a single pass of the slide. The slide also serves as a transfer device for loading and unloading crankshafts into the machine. An air bearing can be developed between the slide and the tooling to assist the operator in removing the tooling from the slide.

33 Claims, 8 Drawing Sheets

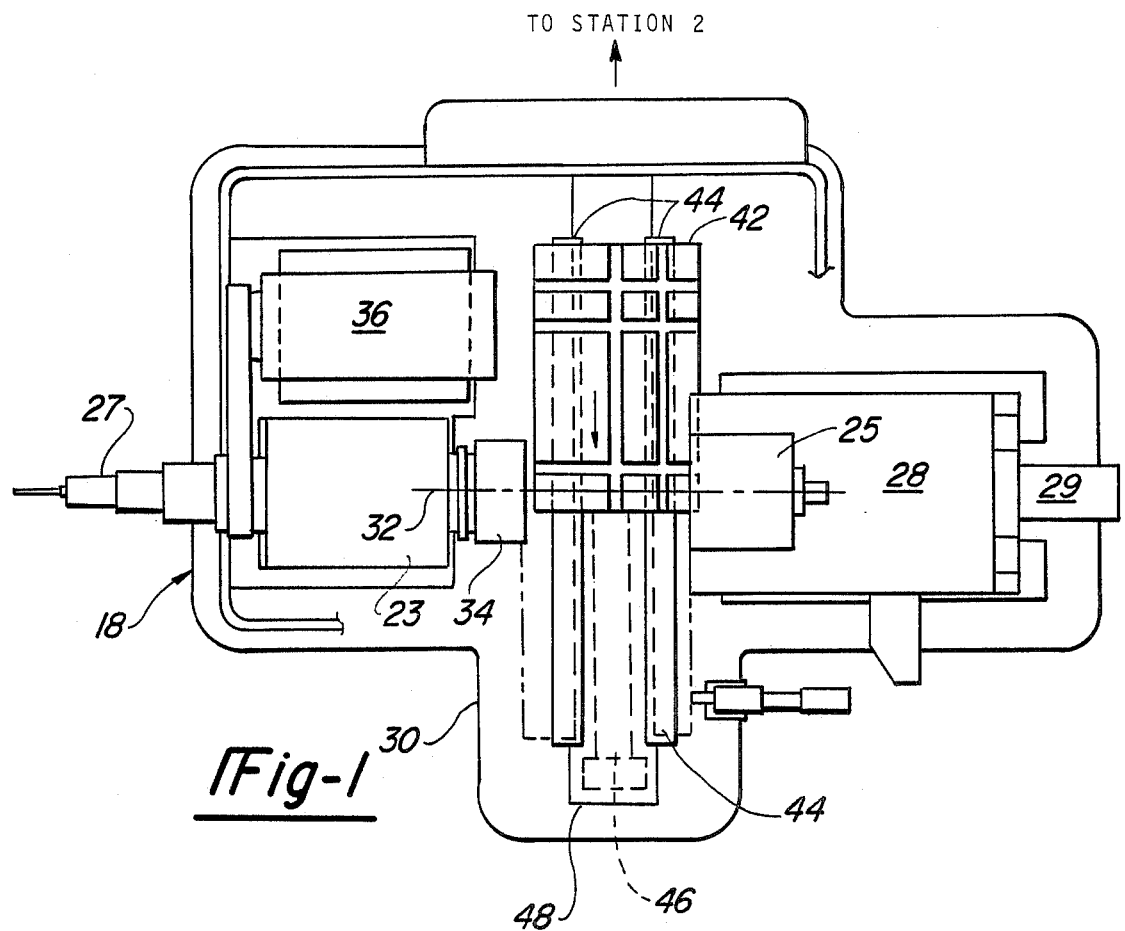
_Fig-1_
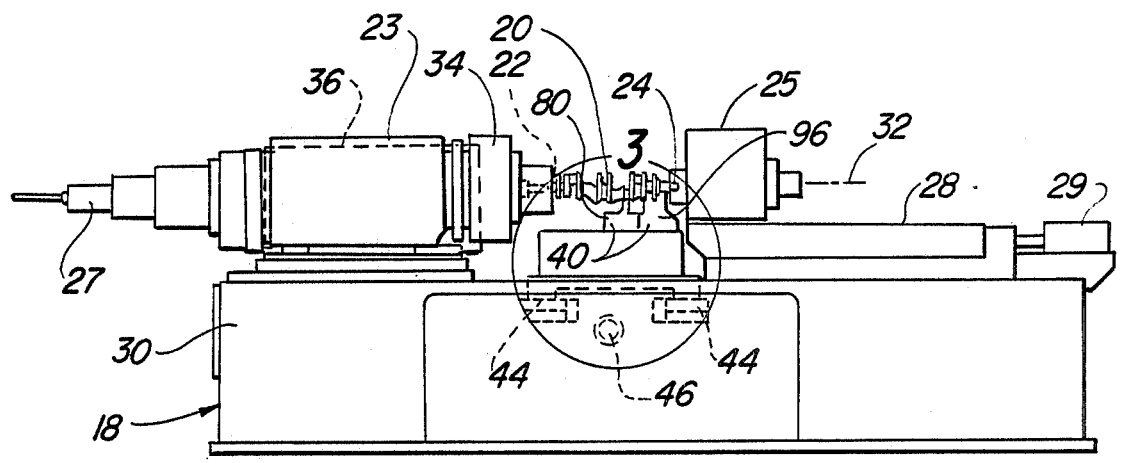
_Fig-2_

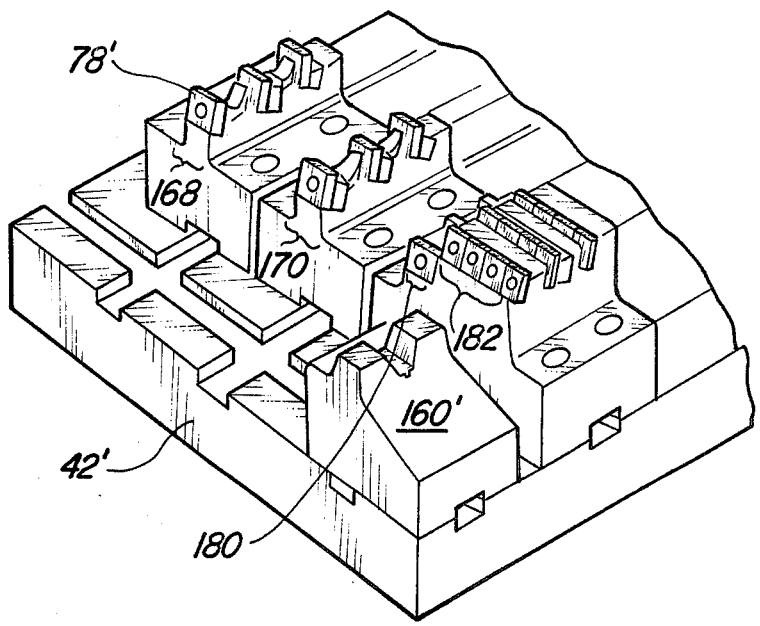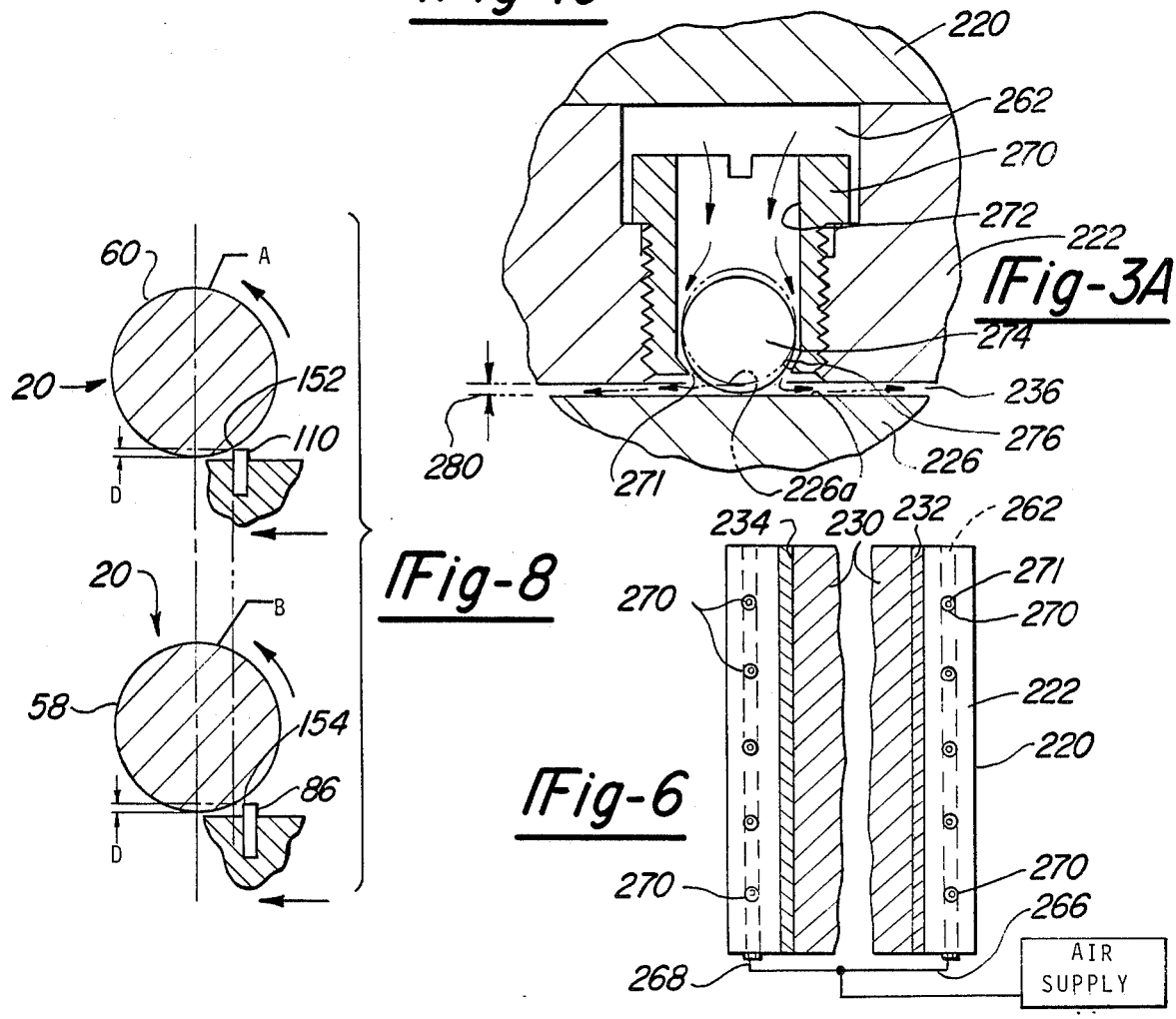

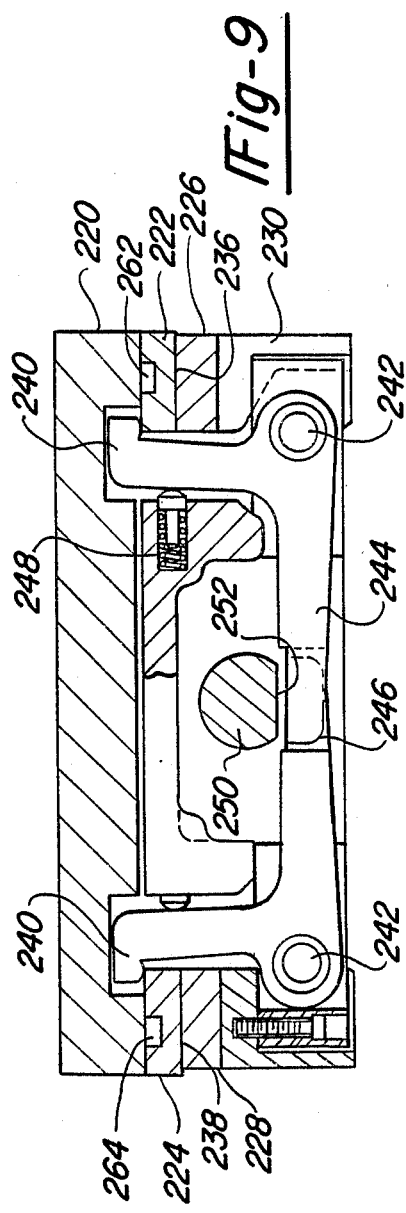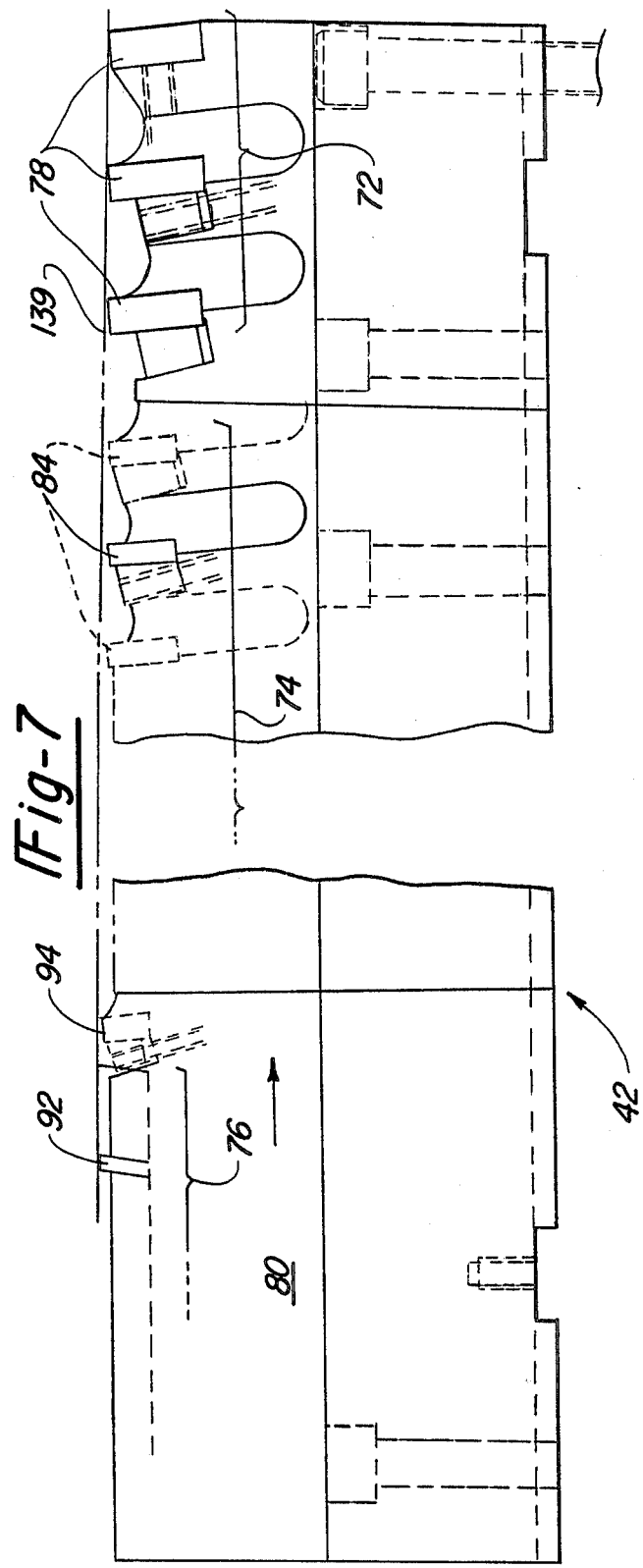

CRANKSHAFT BROACHING MACHINE AND METHOD

This is a continuation of co-pending application Ser. No. 004,264, filed on Jan. 9, 1987, now abandoned, which in turn is a continuation of Ser. No. 627,360, filed on July 3, 1984, now abandoned.

TECHNICAL FIELD

This invention relates to a broaching machine and method for machining main bearings and crankpin bearings on a crankshaft for an automotive engine and, more particularly, to an arrangement of removable cutting tool inserts on a horizontally reciprocating slide below the crankshaft to machine a plurality of bearings and distribute machining forces over the machining operation during a single pass of the slide.

BACKGROUND

A machining technique frequently used commercially today to machine the main bearings and crankpin bearings on automotive crankshafts is known as "plunging". A single cutting tool insert is plunged or fed radially inwardly into the crankshaft at the bearing while the crankshaft is rotating. Plunging has several recognized disadvantages. Ordinarily there is a separate set up machining operation to mill a locating spot on the crankshaft. This is expensive and time consuming. Another disadvantage is the limited tool life of a single insert, resulting in a machine being down many times during a single eight hour shift. Stated differently, if only a single tool is used at each bearing, it will wear out rapidly and require frequent replacement, resulting in the entire machine being down many times during a single eight hour shift.

A still further disadvantage of plunging is that the machining forces are so great that special chucking is usually required to minimize radial deflection and prevent excessive permanent distortion of the crankshaft. A center drive chuck located about midway between the crankshaft ends can be used to minimize excessive distortion when both ends are machined simultaneously. Alternatively a transfer lathe has been used where one end of the crankshaft is machined first and then the crankshaft is turned end-to-end and rechucked to machine the other half. Even with these operations a follow-up green grind is normally used to correct for the permanent distortion during plunging.

It has been suggested that crankshaft bearings might be machined by broaching and, indeed, numerous broaching machines were proposed some forty to fifty years ago. It is not believed that these broaching machines have been commercially exploited in recent years. it might be surmised that the lack of commercialization of these early proposals was due to the relatively high cost of broaches and a failure to recognize the importance of distributing high machining forces required by broaching.

SUMMARY OF THE INVENTION

The principal object of the present invention is to overcome, or at least, minimize the disadvantages of plunging to machining automotive crankshafts and to provide a broaching machine and method for crankshafts and the like that is effective, cost-efficient and commerically acceptable.

More particularly, an object of the invention is to provide a broaching machine and method wherein cutting tools are arranged and disposed in rows to simultaneously machine a plurality of bearings while distributing the machining forces in a smooth, continuous, chatter-free fashion to minimize deflection and permanent distortion of a crankshaft or the like.

A still further object of the present invention is to provide a broaching machine and method particularly adapted for crankshafts that increases the life of the tooling as a whole, so that the tooling lasts longer and requires far less tool changing as contrasted to prior art plunging.

A still further object of the present invention is to provide a broaching machine and method particularly adapted for crankshafts that facilitates part transfer into and out of the broaching machine, and rapid and efficient tool changing when the tooling wears out or when this tooling is changed for different parts.

DESCRIPTION OF THE DRAWINGS

The above objects and other features and advantages of the present invention will be apparent from the following detailed description, appended claims and accompanying drawings in which:

FIG. 1 is a plan view, in somewhat diagramatic form, of a broaching machine that machines bearings on a crankshaft according to the present invention;

FIG. 2 is a front elevational view of the broaching machine of FIG. 1 with a crankshaft in place;

FIG. 3A is an enlarged view of an air bearing shown in FIG. 3;

FIG. 6 is a horizontal sectional view taken on line 6—6 of FIG. 2;

FIG. 7 is a side elevation of one row of inserts;

FIG. 8 is two vertical sections through the tooling and bearings to illustrate an offset in the tools;

FIG. 9 is a vertical section illustrating clamping dogs that lock the tooling to the slide;

FIG. 10 is a fragmentary perspective view of the broaching tools for a second broaching machine similar to that of FIG. 1 for machining the other end of the crankshaft;

DETAILED DESCRIPTION OF THE DRAWINGS

Figure 3:
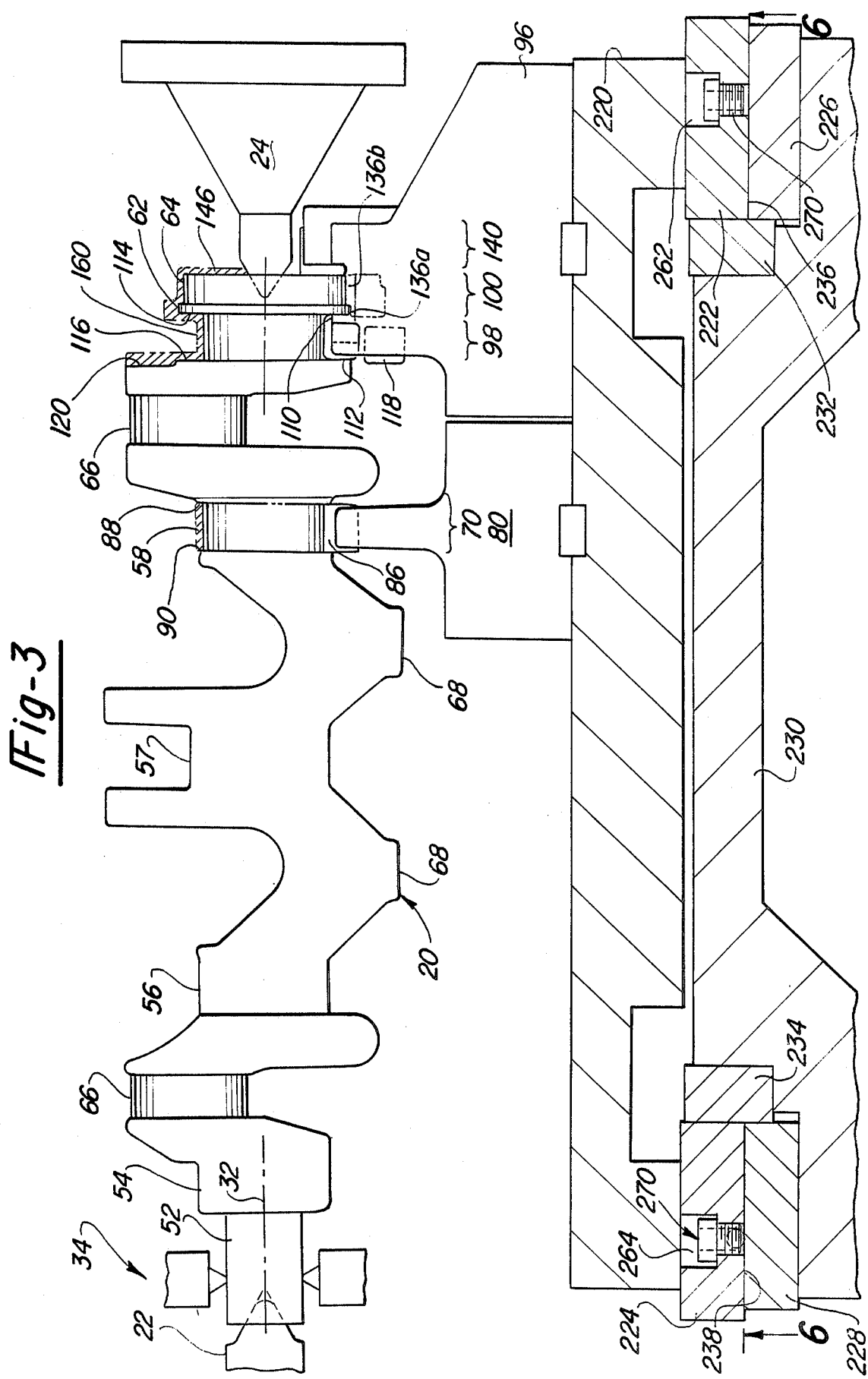
FIG. 3 is a greatly enlarged front elevational view of the crankshaft, broaching tools, and slide taken at the circle "3" of FIG. 2.

Referring now to the broaching machine 18 as shown in the drawings in greater detail, a crankshaft 20 is rotatably carried by a driven center 22 on headstock 23 and a live center 24 on tailstock 25 which in turn is mounted on a slide 28 carried on the machine bed 30 and operated by a cylinder 29. Headstock 23 is stationary on machine bed 30 while center 22 can be extended and retracted from and into headstock 23 by cylinder 27. Hence, centers 22 and 24 can be extended and retracted into and out of engagement with crankshaft 20 for loading and unloading crankshafts between the centers on a rotational axis 32 and into a chuck 34 on headstock 23. Centers 22 and chuck 34 are driven by motor 36. Although only center 22 is described as a driven center, it will be apparent that for some applications the crankshaft could be positively driven at both ends, for example, when all the main bearings are turned simultaneously. However, for the embodiment being described, machine 18 is the first of two broaching stations for machining the bearings and has broaching tooling 40 mounted on a slide 42 carried on ways 44 on bed 30. Slide 42 is reciprocated in opposite horizontal direction by means of a lead screw 46 driven by motor 48. Screw 46 is restrained against axial movement during rotation and engaged with slide 42 by means of a ball nut or the like.

In order to more fully appreciate the arrangement of tooling 40, it is noted that crankshaft 20 (FIG. 3) has a front stub shaft 52, a front main bearing 54, three intermediate (second, third and fourth) main bearings 56, 57 and 58, a rear main bearings 60, an oil slinger ring 62 and an oil seal 64, all of which are to be machined concentric to axis 32. The exemplary crankshaft being described also has two end crankpin bearings 66 and two intermediate crankpin bearings 68. The first station of FIGS. 1 through 5 machines bearings 58 and 60, oil slinger ring 62 and oil seal 64. The material removed at the first station is cross-hatched in FIG. 2. At a second broaching station that is similar to the first station, bearings 54, 56 and 57 are machined along with stub shaft 52.

Referring now to FIGS. 3, 4, 5 and 7, tooling 40 generally comprises a first row 70 of cutting tool inserts arranged in a bumper section 72, a roughing section 74 and a finishing section 76. Tool row 70 machines bearing 58 as the tool row 70 moves from right to left as viewed in FIGS. 4 and 5 (top to bottom as viewed in FIG. 1). Bumper section 72 includes three indexable single point inserts 78 which first contact crankshaft 20 at the location of bearing 58 to cut off high spots. Inserts 78 are held in milled pockets in a tool block 80 on slide 42 by conventional means such as lock screws and wedges designated generally at 82. Roughing section 74 generally comprises eighteen inserts, nine of which are designated by numeral 84 at one side of the block 80 and nine of which are designated 86 at the other side of the block. Inserts 84 and 86 together rough broach the axial surface of bearing 58 with inserts 84 also broaching a radial face 88 and inserts 86 also broaching a radial face 90. In the finishing section 76, there are three larger inserts 92 and two smaller inserts 94 to finish machine bearing 58. As indicated earlier for inserts 78, all of the other inserts are suitably retained in milled pockets on tool block 80 by conventional means such as lock screws and wedges.

Also mounted on slide 42 is a second tool block 96 that carries a second row 98 of cutting tool inserts to machine the rear main bearing 60 and a third row 100 of inserts to machine oil slinger ring 62 and oil seal 64. Row 98 similarly includes a bumper section 102, a roughing section 104 and a finishing section 106. Bumper section 102 has three inserts 108, the roughing section includes sixteen inserts with eight of the inserts 110 being at one side of the bearing and eight of the inserts 112 being at the other side of the bearing to also machine respective radial faces 114 and 116 at bearings 60. Faces 114 and 116 serve as the main axial thrust walls when the crankshaft is mounted in an engine. Roughing section 104 also includes eight additional inserts 118, the first of which is shown mainly in phantom lines in FIGS. 3 and 5 arranged to machine a radial face 120 on a counter-weight adjacent crankpin 66. Inserts 118 are also retained in pockets milled in tool block 96 below, as viewed in FIG. 3, inserts 112 to project laterally outwardly of the tool block in a direction axially of the crankshaft to machine face 120. Finishing section 106 also includes three large inserts 124 and a pair of smaller inserts 126 arranged in opposite sides of row 98 to provide the finishing cuts in a manner similar to the finishing section of 76 in row 70.

The third insert row 100 also has a bumper section 128, a roughing section 130 and a finishing section 132. Bumper section 128 includes three formed inserts 134, roughing section 130 includes thirteen formed inserts 136 and finishing section 132 includes three formed inserts 138. Each of the formed inserts 134, 136 and 138 includes a short portion 134a, 136a and 138a, respectively, and a radially inwardly stepped tall portion 134b, 136b and 138b to machine respectively the oil slinger ring 62, the oil seal 64 and the radial face therebetween as best shown in FIG. 3. Just outboard of row 100 is a fourth row 140 that includes four roughing inserts 142 and two finishing inserts 144 to machine an end face 146.

In accordance with one of the more important aspects of the present invention, the cutting tool inserts, particularly the inserts in the roughing sections 74 and 104 and 130, are arranged to distribute the cutting forces over the machining operation. The inserts in each roughing section get progressively taller from the front to the rear, from left to right as viewed in FIG. 5, as illustrated by the broken line 139 (FIG. 7) to distribute the forces in each row. Next the inserts are skewed relative to the axis 32 or inclined to the travel direction of the slide to distribute cutting forces progressively over the length of the cutting edge of each insert. Additionally the inserts in one row are staggered or offset, sometimes very slightly from inserts in the other rows such that each insert is preferably cutting one insert at a time or, at the least, two or more inserts are not taking an initial bite at the same time during the forward motion of the slide 42. Hence by offsetting or staggering inserts, the cutting forces are further distributed.

By way of further example, one of the inserts 136 (row 100) has a leading edge 147 that takes an initial bite and continues cutting along its cutting edge 148 until the trailing edge 150 on insert 136 completes its machining just prior to initial contact at the leading edge 152 of the adjacent insert 110 (row 98) which in turn completes its machining before the leading edge 154 on one of the inserts 86 (row 70) takes its initial bite. See FIGS. 5 and 8. Although its certainly not essential in all cases that only one insert be machining at a time, according to the invention it is important that the machining forces be distributed to maximize the machining efficiency, decrease cycle time and minimize deflection and permanent distortion of the crankshaft. By way of still further example, the next adjacent insert 136 (designated 156 in FIG. 5) immediately to the right of insert 148 is illustrated as being arranged to be machining when the adjacent one of the inserts 110 (designated 158 in FIG. 5) initiates its cut. Although it is preferable that the inserts be completely staggered, the last mentioned arrangement of overlapping inserts has been disclosed to demonstrate that effective machining can be achieved by substantially eliminating the overlap machining.

Figure 4:
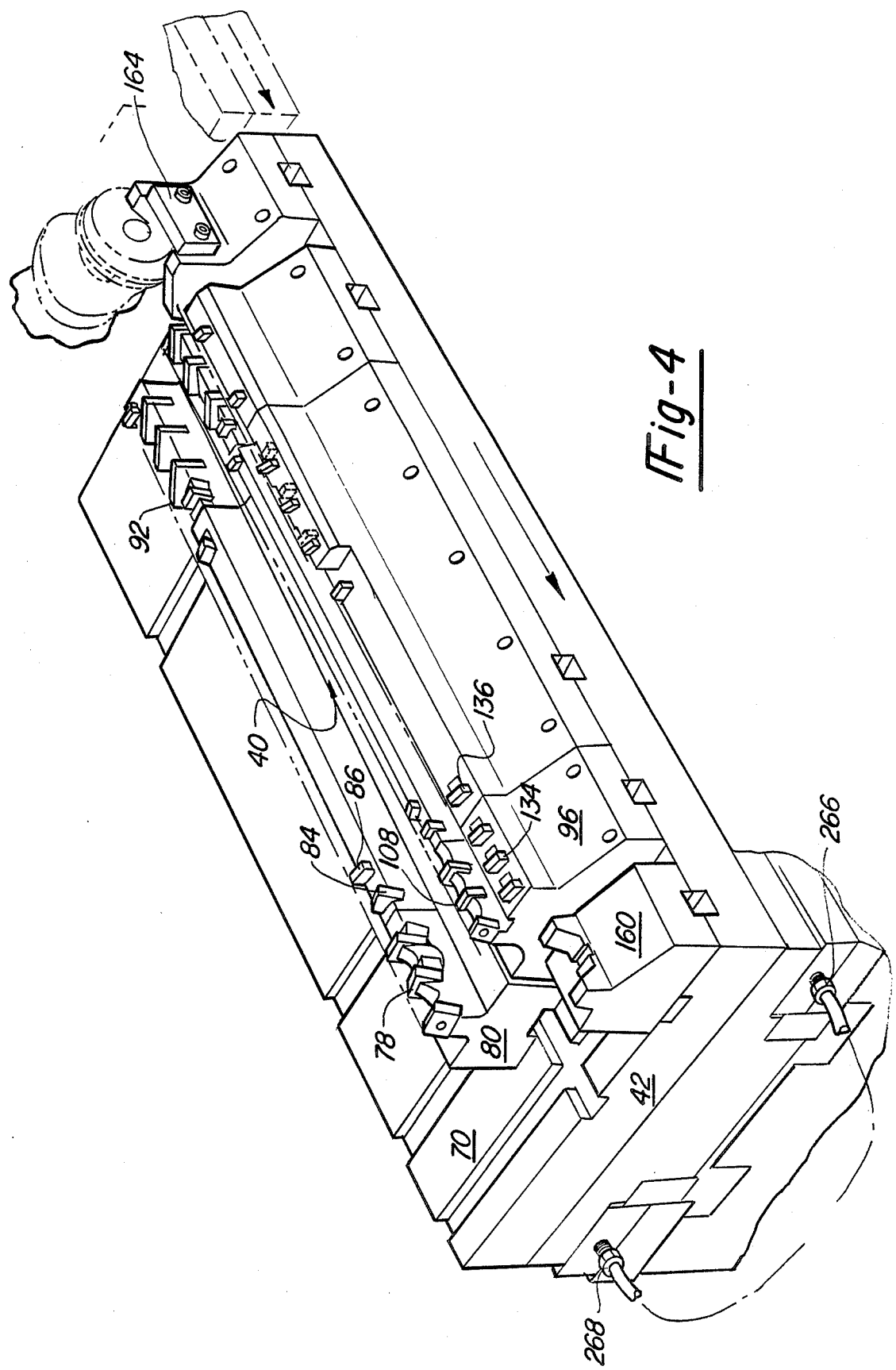
FIG. 4 is a diagramatic perspective view of a horizontally reciprocating tooling slide in the machine of FIGS. 1 and 2 to show the arrangement of cutting tool inserts.
Figure 5:
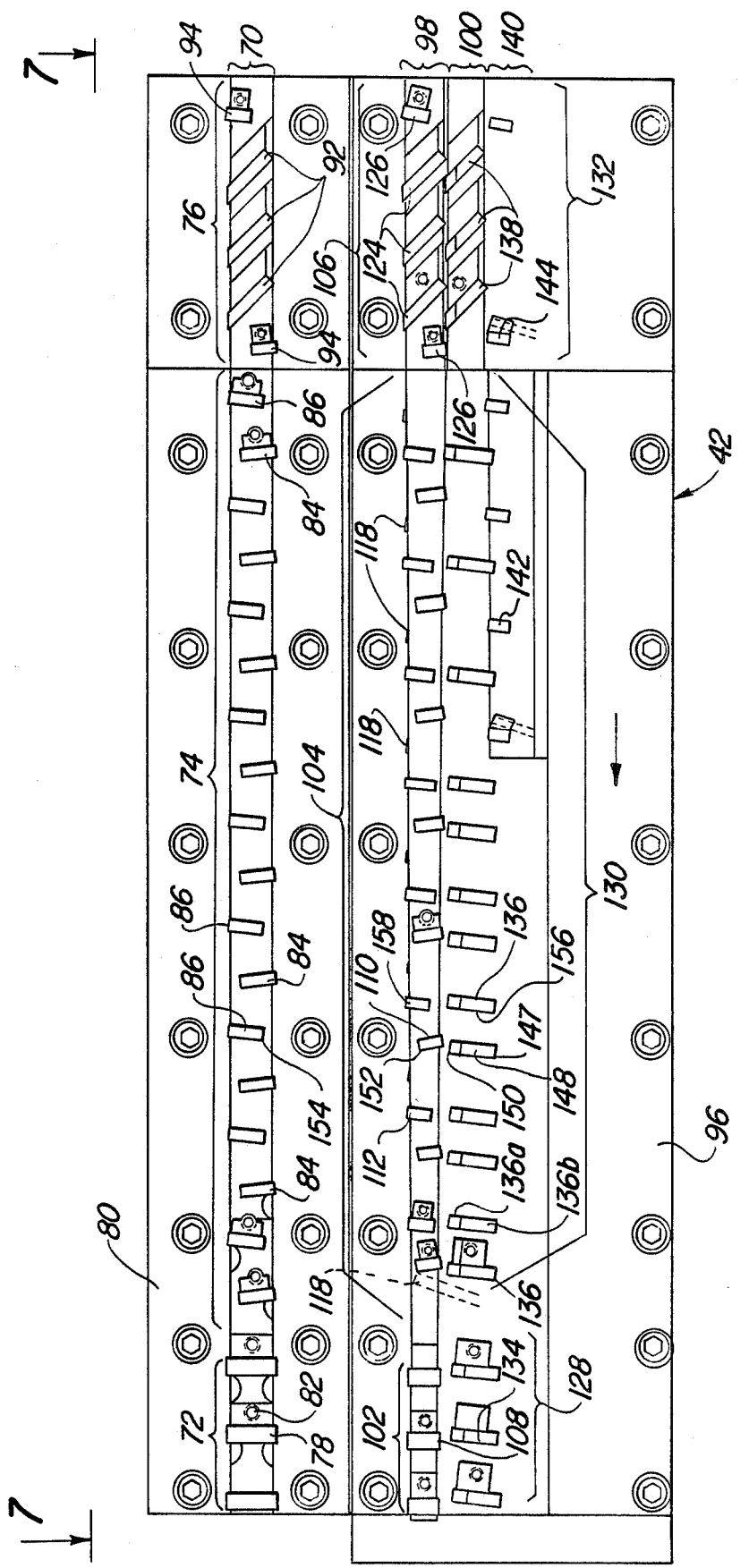
FIG. 5 is an enlarged top view of the tooling slide of FIG. 4.

Referring again to FIG. 4, a pair of cradles 160 (only one of which is shown in FIG. 4) is mounted on slide 42 ahead of tooling 40 and a second pair of cradles 164 (only one of which is shown in FIG. 4) is mounted at the opposite end of slide 42 behind tooling 40. With slide 42 in its extended position, at the end of a machining operation, the finished crankshaft will be between the centers 22 and 24 (FIGS. 2 and 3) and when the centers are retracted, it will drop into the cradles 164 (FIG. 4). More particularly when chuck 34 is released, the cylinders 27 and 29 move centers 22 and 24 in unison (from left to right as viewed in FIG. 2) to eject crankshaft 20 from chuck 34 and locate the crankshaft over cradles 164. Then when center 24 moves further to the right and center 22 is retracted to the left, the crankshaft 20 drops onto cradles 164. The slide is then retracted to transfer the finished crankshaft to a location away from the centers where it can be easily unloaded from the machine 18 for transfer to the second station as indicated in FIG. 1. Also when slide 42 is in the fully extended position at the end of the broaching operation, a new unmachined crankshaft can be transferred into cradles 160. When the slide is fully retracted, the new crankshaft is transferred by cradles 160 into position between centers 22 and 24. As the centers close, they pick up the part from the cradle and transfer it into the chuck to ready the machine for the next broaching operation.

Figure 11:
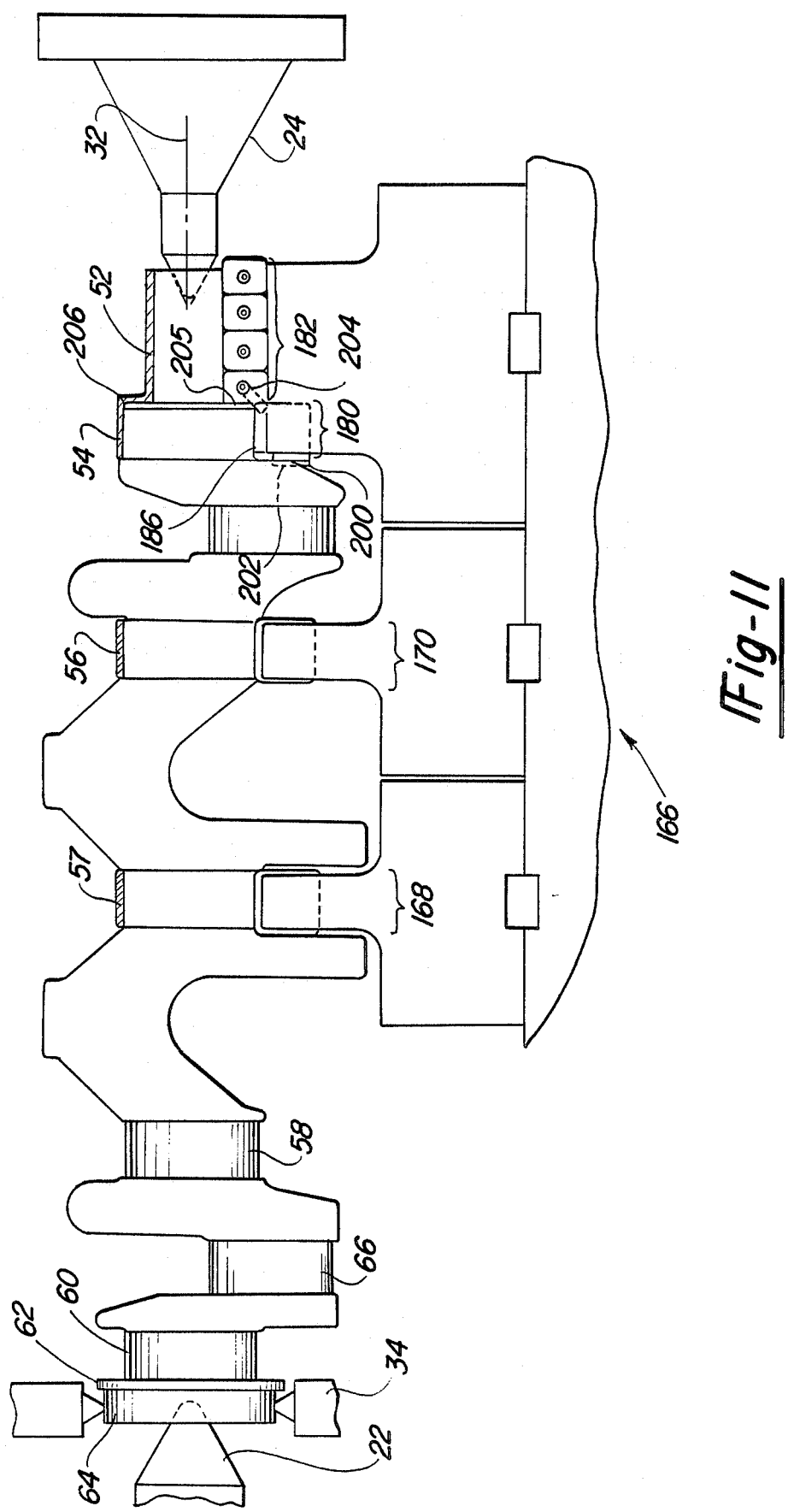
FIG. 11 is an enlarged view, similar to FIG. 3 of the crankshaft in the second broaching machine.
Figure 12:
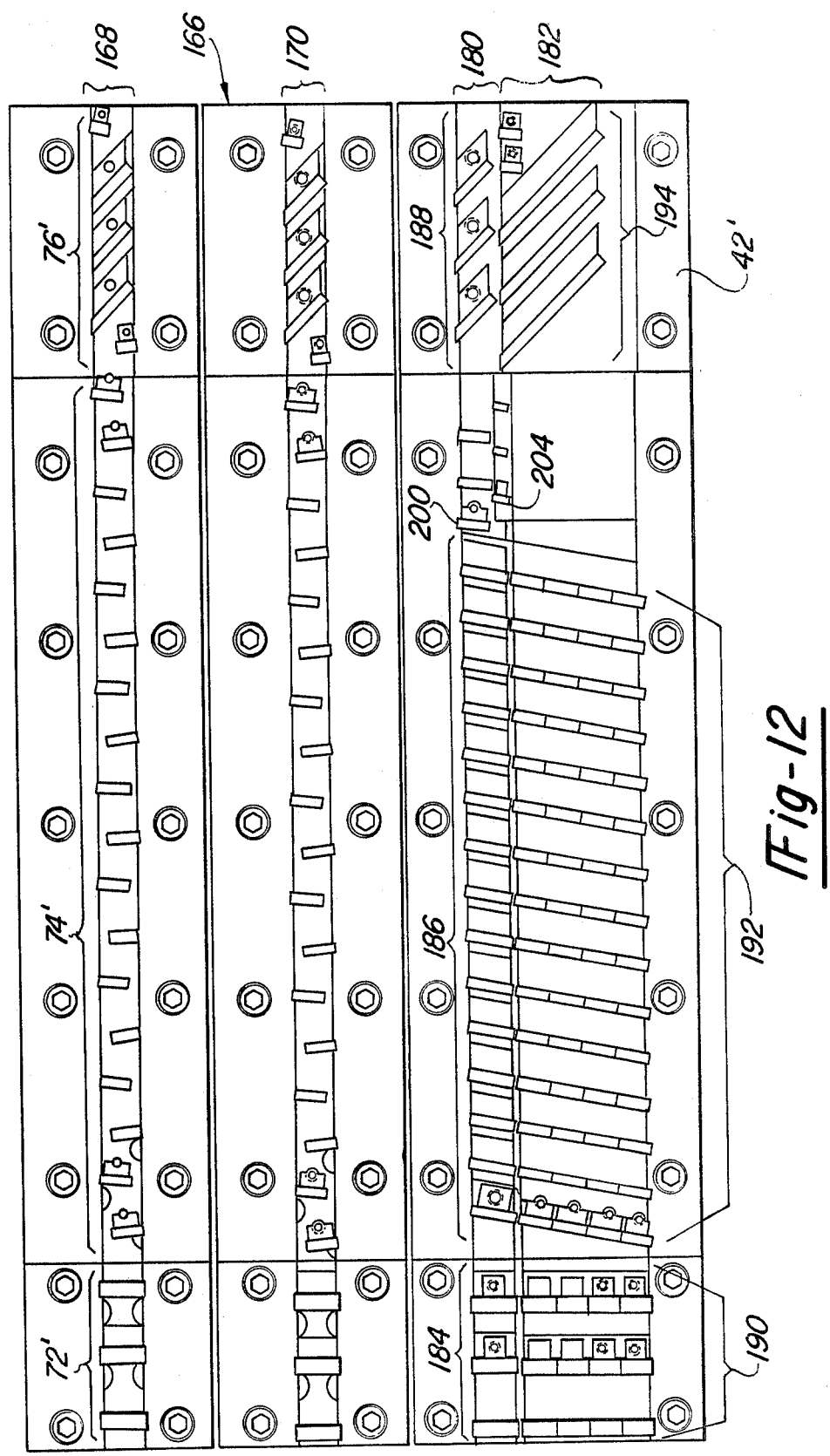
FIG. 12 is a top view showing the arrangement on the inserts on the slide of FIGS. 10 and 11.

Before describing the overall operation of the machine at station one, the corresponding tooling for the second broaching station will be briefly described (FIGS. 10, 11 and 12). For purposes of illustration, the second machining station (not fully shown in detail) is a machine identical to machine 18 of FIGS. 1 and 2 but having different tooling 166 carried on slide 42. Hence in FIGS. 10, 11 and 12, elements corresponding to elements at station one are identified by corresponding numbers with a prime designation. Using identical machines, the crankshaft may be turned end-to-end when it is transferred from station one to station two so that in station two the front end of the crankshaft, i.e., the stub shaft 52, is engaged by center 24. Tooling 166 includes a first insert row 168 that has the same insert arrangement as row 70 in station one (FIG. 5) but is disposed axially of the crankshaft at the third main bearing 57 (FIG. 11). Similarly, the second tooling row 170 has inserts arranged the same as insert row 70 (FIG. 5) but disposed axially of the crankshaft to machine the second main bearing 56.

Inserts in row 168 are offset longitudinally of the slide from the inserts in row 170 so that each insert row initiates its machining just before machining is initiated at the corresponding insert in the other row. The inserts are also skewed and progressively taller from the front to the rear of the slide. Tooling 166 also includes a third row of inserts 180 arranged on the slide axially of the crankshaft to machine the front main bearing 54 and a fourth row of tooling 182 to machine the stub shaft 52 and a radial face 205 joining bearing 54 and shaft 52. The inserts in row 180 are arranged in a bumper section 184, a roughing section 186 and a finishing section 188 and inserts in row 182 are similarly arranged in a bumper section 190, a roughing section 192 and a finishing section 194. In row 180, between the roughing section 186 and the finishing section 188, there are also three inserts 200 projecting laterally of the tooling and axially of crankshaft 20 to machine a radial face 202 on the crankshaft. Similarly, in row 182, between the roughing section 192 and the finishing section 194, there are three inserts 204 to machine a chamfer 206 at the front end of bearing 54 adjacent face 205.

It will be apparent that the configuration of the front end of the crankshaft is simpler than the rear end which includes the oil slinger ring and the oil seal. Due to the amount of material removed at the stud shaft 52, it was not practical to have only one insert machining at a time. However, the leading edges of the inserts are staggered or offset to distribute the machining forces.

According to another important aspect of the present invention, the horizontally reciprocating arrangement of slide 42 facilitates a bearing arrangement for quick tool changing as shown in FIGS. 3, 3A, 4, 6 and 9. The tool blocks 80 and 96 are fastened on a flat upper platen 220. A pair of upper rails 222 and 224 are fixedly mounted on platen 220 at the lower face thereof and at respective opposite edges extending longitudinally the full length of the platen. Rails 222 and 224 in turn rest on the respective lower rails 226 and 228 which are fixedly mounted on a lower platen 230 that is reciprocally mounted on ways 44 on bed 30. Rails 222, 224, 226 and 228 are in turn positioned laterally of the slide by a pair of guide rails 232 and 234 carried on the lower platen 230. Hence, as will later be described in greater detail, the upper platen 220 along with rails 222 and 224 is slideable on the lower rails 226 and 228 at the interfaces 236 and 238.

Referring to FIG. 9, the upper platen 220 is locked on the lower platen 230 by a pair of dogs 240 pivotally mounted on the lower platen 230 by pins 242 and having bell crank arms 244 extending laterally inwardly of the slide and terminating at actuating tips 246 that overlap the actuating tip from the opposite arm. Dogs 240 are biased in a locking position laterally outwardly of the slide by compression springs 248 with tips 246 in a corresponding raised position shown in FIG. 9. Rotatably mounted in the lower platen 230 is an actuating rod 250 having a flat 252 that allows tips 246 to move to their upward position and dogs 240 to their outward locking position. When rod 252 is rotated, tips 246 will be moved downwardly pivoting both dogs 240 laterally inwardly to unlock the upper platen 220 from the lower platen 230.

To expedite rapid tool changing an air bearing (FIGS. 3, 3A and 6) is provided at the interfaces 236 and 238 to minimize friction between the upper rails 222 and 224 and the lower rails 226 and 228. Each of the rails 222 and 224 is formed with a respective longitudinal slot 262 and 264 that serves as a passageway for compressed air supplied via respective inlet fittings 266 and 268 (FIG. 4). Spaced a longitudinally along slots 262 and 264 are a plurality of hollow fittings 270 threaded in the rails 222 and 224 and opening at their lower ends 271 at one of the interfaces 236 and 238. Carried in the passageway 272 of each fitting is a ball 274 that serves as a safety check valve. The lower end of the fittings 270 have radially inwardly projecting shoulders 276 that serve as valve seats so that when balls 274 seat on shoulders 276, the valves close.

In the absence of pressurized air in slot 262, the top rails 222 and 224 will be in their lowered position resting on the lower rails 226 and 228 with no clearance at interfaces 236 and 238. In this position, dogs 240 lock the top platen 220 to the lower platen 230. When platen 220 is in its locked position, ball 274 is pushed up into the fittings by the top face 226a of rail 226 as shown in phantom lines in FIG. 3A. When it is desired to change the tooling, the dogs 240 are retracted by operating rod 250 to unlock the upper platen 220 from the lower platen 230. Compressed air supplied to slots 262 and 264 via inlets 266 and 268 can flow around the balls 274 and out of the lower open ends 271 of passageway 272 as shown in phantom line arrows. The air pressure against rail 226 at face 226a of interface 236, lifts platen 220 slightly which in turn allows the escaping air to flow as shown in full line arrows in a restricted manner between the rails 222, 226 and the rails 224, 228 forming air layers or air bearings therebetween at the now slightly open interfaces 236 and 238. Platen 220 will only move upward until the system equalizes or balances with a slight clearance designated 280 (FIG. 3A) at the interface 236. Balls 274 drop down slightly as shown in full lines maintaining contact with face 226a but do not seat on shoulders 276 so long as the desired clearance 280 is being maintained. If the clearance 280 gets too large, the balls will drop down further and restrict the air flow to in turn bring the upper platen back down to the desired clearance with the lower platen. The air pressure and air flow is selected to maintain clearance 280 and hence, maintain the air bearings as the platen 220 is slid off the lower platen 230 manually by the operator. As respective nozzles clear the lower platen, the ball will now drop down to close the valve, and thus maintain the air pressure and hence the air bearing at the nozzles that have not cleared the lower platen. The particular air bearing described allows relatively heavy tooling to be easily removed from the horizontally oriented slide 42. Although a particular type of air bearing has been described, various other types of bearings could be used due to the horizontal orientation of slide 42.

SUMMARY OF OVERALL OPERATION

Although the overall operation of the broaching machine and broaching method should be apparent from the foregoing detailed description of the drawings, with the slide in a fully extended position (lower position as viewed in FIG. 1) with carriers 164 disposed between centers 22 and 24, an unmachined crankshaft is loaded into the carriers 160 and the slide is retracted to position the crankshaft between centers 22 and 24 (upper position as viewed in FIG. 1). The centers are extended to engage the crankshaft and load the crankshaft into chuck 34. Slide 42 is then moved from its retracted position toward its extended position by rotating screw 46. As slide 42 moves from right to left as viewed in FIGS. 4 and 5 (top to bottom as viewed in FIG. 1) inserts in the bumper sections 72, 102 and 128 cut out the roughness and then inserts in the roughing and finishing section broach bearings 58 and 60, faces 88, 90, 114, 116, 120 and 146, ring 62 and seal 64.

Heavy machining forces occur primarily at the roughing sections. By way of example, for a cast iron crankshaft having an initial rough weight of twenty-two pounds, approximately three pounds of material or a minimum of 0.134 inches at all machined surfaces is removed by the two stations, primarily at the roughing sections. This amount of material removed, even when using the present invention, creates severe forces on the crankshaft. Yet effective machining is achieved without excessive deflection and permanent distortion of the crankshaft. Although the most severe machining forces would be usually encountered in the roughing sections, the forces in the finishing sections might also be severe. Hence, it is desirable to distribute the machining forces over the finishing insert sections as well. During machining, chips are removed by conventional means (not shown) such as coolant or high speed air.

At the end of the travel of slide 42, the centers are retracted and the finished crankshaft is transferred onto carrier 164. Slide 42 is then moved to its retracted position (shown in full lines in FIG. 1) i.e., from bottom to top as viewed in FIG. 1 and from left to right as viewed in FIGS. 4 and 5, moving the finished part away from the centers to a location where it can be picked up and transferred from station one to station two. In the preferred embodiment, the section station machine is oriented identically to the machine in station one. Hence, during the transfer from station one to station two the part is turned endwise 180° so that now the stub shaft 52 is positioned at the live center 24 in station two. The other end of the crankshaft can then be broached in a manner that should be readily understood from the foregoing description of the broaching operation at station one.

Although a specific embodiment has been described wherein one half of the crankshaft is broached at one station and the other half is broached at another station, the broaching technique described can be extended to do all of the main bearings at one station with one pass of tooling. Existing crankshaft lines require two machining stations for plunge tooling and hence there are some advantages in keeping the machining operation divided between two stations, for example, to utilize existing plant layout and operator responsibility. Also, the two station approach may, in some instances, be more universal where different crankshafts are machined on the same line by changing the tooling. The broaching machine and method described herein may also be used for machining the crankpin bearing by using conventional offset chucking to effectively rotate the crankshaft on the crankpin axis.

The arrangement of the broaching inserts on a horizontally reciprocating slide beneath the crankshaft provides a very acceptable arrangement compatible with existing machine layout and loading and unloading equipment used commercially. The reciprocating horizontal slide also provides a convenient arrangement for changing tooling. With the tool blocks arranged on top of the slides, after the blocks are unlocked from the slide an operator can easily slide the tooling off the slide using the air bearing described hereinabove.

Moreover, as indicated earlier, according to a principal aspect of the present invention, the arrangement and disposition of the inserts distributes machining forces over the machining operation. The inserts are progressively higher in a front-to-rear direction of the slide so that machining forces are distributed between inserts in each of the rows. Secondly, each of the inserts has its cutting edge inclined to the direction of travel to distribute machining forces over the length of the cutting edge as it moves progressively into the bearing. Thirdly, where practical, the leading edge of the inserts in one row are offset relative to the leading edge of inserts in the other rows so as to distribute machining forces between the rows.

Where required, the tool builder will lay out the inserts to minimize simultaneous machining by more than one insert but it may not be practical in all cases to accomplish this desired result. Hence, where an overlap occurs excessive machining forces can be minimized by selecting the particular inserts that do machine simultaneously to best distribute the machining forces.

The present invention also contemplates controlling the speed of travel of the slide to optimize the machining forces on the crankshaft even where two inserts are machining simultaneously. For example, the slide can move rapidly when only one insert is machining and then the speed can be reduced when two inserts are machining simultaneously. Speed control could of course be accomplished by preprogramming or, by use of a servo system or the like, responsive to the actual instantaneous machining forces. It has been found that very precise control of the travel of the tool slide 42 can be achieved using a precision lead screw arrangement as shown in the drawing, as contrasted to other more conventional techniques.

It will be apparent that for any given crankshaft or other plural bearing machining operation it may not be necessary, even though it might otherwise be preferred, to use all of the force distributing techniques for all of the cutting tools. It is important however, and inddeed an important aspect of the present invention is the recognition that a plurality of bearings can be machined simultaneously by using a relatively large number of inserts arranged for optimal distribution of cutting forces. In fact this recognition overcomes many disadvantages of prior art crankshaft machining techniques. Moreover, it has been found that for machining bearings, a minimum number of at least about eight to twelve inserts in each tooling row is required to remove sufficient material at a bearing without generating excessive machining forces. Because a large number of inserts are used, the distribution of machining forces permits one to perform the machining operation using cost-efficient power requirements. By distributing the machining forces, crankshaft deflection and distortion can be held within acceptable manufacturing tolerances. Because machining forces are distributed over a relatively large number of cutting tools, the life of each individual tool is extended greatly so that a tool set up of the type shown in the drawing for machining crankshafts will easily last for a complete eight hour shift. Each of the cutting tools is preferably an indexable throw-away tungsten carbide insert of general conventional configuration so as to be inexpensive and readily available. Hence, it is a relatively simple and comparatively inexpensive procedure to remove the entire tool block and replace individual inserts.

Although the term "broaching" has been used in connection with describing the present invention, it will be apparent that the term is not used in a strictly conventional sense because broaching conventionally does not involve a rotating work piece. On the other hand, the arrangement of the tooling on the reciprocating slide is more in the nature of broaching tooling and the amount of material removed by a single pass of the slide is on the same order to magnitude as the material removed in a broaching operation.

It will be understood that the broaching machine and method have been described hereinabove for purposes of illustration and are not intended to indicate limits of the present invention, the scope of which is defined by the following claims:

I claim:

1. A broaching lathe for use in machining a plurality of bearings on a crankshaft or the like comprising rotatable work holder means for rotatably supporting a crankshaft on a horizotally disposed rotational axis, said crankshaft having front and rear main bearings at opposite ends thereof, said rotatable work holder means including a first center at one end of said crankshaft and a second center at the other end of said crankshaft, at least one of said centers being a driven center and said lathe being free of any center drive chuck that drivingly engages said crankshaft at a location intermediate said front and rear main bearings, a machine tool slide mounted on sid machine for substantially horizontally reciprocating movement in a substantially horizontal plane below said crankshaft and in a direction perpendicularly to and spaced radially from said rotational axis, a first plurality of at least about eight to twelve cutting tools mounted on said slide in a first row with upwardly projecting cutting edges for progressively machining a first bearing when said slide is reciprocated and a second plurality of at least about eight to twelve cutting tools mounted on said slide in a second row with upwardly projecting cutting edges for progressively machining a second bearing when said slide is reciprocated, said cutting tools in said first and said second rows comprising disposable inserts that are individually and removably mounted, and wherein the cutting tools at a rear end of said slide project deeper into said crankshaft than do the cutting tools at a front end of said slide during a machining operation to thereby progressively distribute machining forces between the cutting tools in each row, said cutting tools have cutting edges inclined to the direction of travel of the slide so as to provide a leading cutting edge portion and a trailing cutting edge portion so that each cutting edge feeds progressively into said bearing to thereby distribute cutting forces along each inclined cutting edge and, the leading cutting edge portions of the cutting tools in said first row are offset in the direction of travel of said slide from the leading edge portions of the cutting tools in said second row so as to distribute machining forces between the cutting tools in said first and second rows.

2. The broaching lathe set forth in claim 1 wherein said first and second rows of cutting tools each include at least two groups of cutting tools one of which is for rough machining and the other is for finish machining and wherein substantially all of the cutting tools in the rough machining group are inclined to distribute cutting forces along the cutting edges.

3. The broaching lathe set forth in claim 2 wherein substantially all of the cutting tools in said rough machining group in one row have leading edge portions offset in the direction of travel of said slide from leading edge portions in the other row to thereby distribute machining forces between the cutting tools in said first and second rows.

4. The broaching lathe set forth in claim 1 wherein said first and second rows of cutting tools include at least two groups of cutting tools one of which is for rough machining and the other of which is for finish machining and wherein substantially all of the tools in said rough machining group in one row have leading edge portions offset in the direction of travel of said slide from leading edge portions in the other row to thereby distribute machining forces between the cutting tools in said first and second rows.

5. The broaching lathe set forth in claim 1 for use in machining a crankshaft with at least three bearings and wherein a third plurality of cutting tools are mounted on said slide in a third row with each of the cutting tools including upwardly projecting cutting edges for progressively machining said third bearing when said slide is reciprocated, and wherein the cutting tools at a rear end of the said third row project deeper into said crankshaft than do the cutting tools at a front end of said row to thereby progressively distribute machining forces between the cutting tools in said third row during a machining operation and wherein substantially all of said cutting tools are throwaway inserts and there are at least about eight to twelve inserts in each of said rows.

6. The broaching lathe set forth in claim 1 wherein said slide comprises a lower platen mounted on said machine for horizontally reciprocating movement in a horizontal plane, an upper platen slideable on said lower platen in a substantial horizontal direction, said first and said second plurality of cutting tools being mounted on said upper platen, and means releasably fastening said upper platen to said lower platen during a machining operation so that said fastening means can be released and said upper platen together with said cutting tools can be slideably removed from said lower platen.

7. A broaching lathe for use in machining a plurality of bearings on a crankshaft or the like comprising rotatable work holder means rotatably supporting a crankshaft on a rotational axis, said crankshaft having front and rear main bearings at opposite ends thereof, said rotatable work holder means including a first center at one end of said crankshaft and a second center at the other end of said crankshaft, at least one of said centers being a driven center and said lathe being free of any center drive chuck that drivingly engages said crankshaft intermediate of the front and rear main bearings, a machine tool carrier mounted on said machine for movement in a first direction along a first path perpendicular to and spaced radially from said axis, a first plurality of at least about eight to twelve cutting tools mounted on said carrier in a first row with cutting edges projecting toward said axis to machine a bearing when said carrier moves in said first direction, and a second plurality of at least about eight to twelve cutting tools mounted on said carrier in a second row with cutting edges projecting toward said axis to machine a second bearing when said carrier moves in said first direction, said cutting tools in said first and said second rows comprising disposable inserts that are individually and removably mounted, and wherein the cutting tools in each row at a rear end of said carrier project deeper into said crankshaft than do the cutting tools at a front end of said carrier to thereby distribute machining forces between the cutting tools in each row during a machining operation, the cutting tools in each row have cutting edges inclined to said first direction to provide a leading cutting edge portion and a trailing cutting edge portion so that the cutting edges feed progressively into said bearings to thereby distribute cutting forces along said cutting edges, and wherein the leading cutting edge portions of the cutting tools in said first row are offset in the direction of travel of said slide from the leading edge portions of the cutting tools in said second row so as to further distribute machining forces between the cutting tools in said first and second rows.

8. The broaching lathe set forth in claim 7 wherein said upper platen is slideable on said lower platen at an interface therebetween and wherein said slide further comprises bearing means operable when said fastening means is released to reduce sliding friction at said interface and facilitate rapid manual removal of said upper platen by an operator.

9. The broaching lathe set forth in claim 8 wherein said bearing means comprises means for introducing pressurized air to said interface so as to lift said upper platen from said lower platen at said interface and provide a layer of air flowing between said upper and lower platens at said interface and forming an air bearing between said upper and lower platens.

10. The broaching lathe set forth in claim 7 wherein said first and second rows of cutting tools each include at least two groups of cutting tools one of which is for rough machining and the other is for finish machining and wherein substantially all of the cutting tools in the rough machining group are inclined to distribute cutting forces along the cutting edges.

11. The broaching lathe set forth in claim 10 wherein substantially all of the cutting tools in said rough machining group in one row have leading edge portions offset in the direction of travel of said slide from leading edge portions in the other row to thereby distribute machining forces between the cutting tools in said first and second rows.

12. The broaching lathe set forth in claim 7 wherein said first and second rows of cutting tools include at least two groups of cutting tools one of which is for rough machining and the other of which is for finish machining and wherein substantially all of the cutting tools in said rough machining group and in one row have leading edge portions offset in the direction of travel of said slide from leading edge portions in the other row to thereby distribute machining forces between the cutting tools in said first and second rows.

13. A lathe for use in machining a plurality of bearings on a crankshaft or the like comprising rotatable work holder means for rotatably supporting a crankshaft on a horizontally disposed rotational axis, a machine tool slide mounted on said machine for substantially horizontally reciprocating movement in a substantially horizontal plane below said crankshaft in a direction perpendicular to and space radially from said rotational axis, a first plurality of cutting tools mounted on said slide for progressively machining a first bearing when said slide is reciprocated and a second plurality of cutting tools mounted on said slide for progressively machining a second bearing when said slide is reciprocated and wherein said first and second plurality of cutting tools are carried on said slide between opposite ends thereof and further comprising first carrier means mounted on said slide at one end thereof for receiving a first crankshaft and transferring it between a first position remote from said work holder means and a second position at said work holder means when said slide moves between an extended position and a retracted position.

14. The broaching lathe set forth in claim 13 further comprising second carrier means mounted on said slide at the other end thereof for receiving a second crankshaft and transferring it between said second position and a third position when said slide moves between said extended and retracted positions, said third position being remote from said both said work holder means and said first position.

15. The broaching lathe set forth in claim 14 wherein said slide is arranged and disposed relative to said work holder means such that said first carrier means is at said first position and said second carrier means is at said second position when said slide is in its extended position and said first carrier means is at said second position and said second carrier means is at said third position when said slide is in its retracted position whereby said first carrier means will transfer a first crankshaft to said work holder means and said second carrier means will simultaneously transfer a second crankshaft away from said work holder means as said slide moves from its extended position to its retracted position.

16. The broaching lathe set forth in claim 13 wherein one of said carrier means is mounted on said slide so as to be disposed below said work holder means when said one carrier means is at said second position so that a crankshaft can drop from said work holder means onto said one carrier means.

17. The lathe set forth in claim 14 wherein said cutting tools are mounted on said slide in first and second rows extending from the front end of said slide to the rear end of said slide with the cutting tools in each row projecting upwardly and with the cutting tools at the rear end of said slide projecting higher than the cutting tools at the front end of said slide to thereby progressively machine said bearings when said slide is reciprocated and wherein reciprocation of said slide simultaneously moves said first carrier means to its extended position to receive said first crankshaft and said second carrier means to said work holder means to receive said second crankshaft when said slider is extended at the end of a machining operation and then moves said first crankshaft to said work holder means and said second crankshaft away from said work holder means when said slider is retracted.

18. A method of making a crankshaft or the like having a plurality of bearings concentric about a common axis extending longitudinally of the crankshaft comprising rotating the crankshaft on said axis while moving at least a first series and a second series of cutting tools in a first direction along respective first and second paths perpendicular to and spaced radially from said axis and in progressive machining engagement with respective bearings so as to substantially simultaneously turn a plurality of bearings concentric to said axis while distributing machining forces over a machining operation, said crankshaft having front and rear main bearings at opposite ends thereof and being rotated by drivingly engaging said crankshaft at at least one end and not at a location intermediate said front and rear main bearings, and wherein said machining forces are distributed over the machining operation by disposing a first plurality of at least about eight to twelve disposable cutting tool inserts that are individually and removably mounted in a first row extending in said direction perpendicular to said axis at a position longitudinally of said axis at a first bearing while simultaneously disposing a second plurality of at least about eight to twelve disposable cutting tool inserts that are individually and removably mounted in a second row extending in said direction perpendicular to said axis at a position longitudinally of said axis at a second bearing with the cutting tools at a rear end of each row projecting deeper into the crankshaft than the cutting tools at a front end of the row so that when the cutting tools are moved rectilinearly, the cutting tools in each row sequentially and progressively machine said bearings to thereby distribute the machining forces between the cutting tools in each row relative to other cutting tools in that row, said tools also being moved rectilinearly while being disposed at an inclined angle to the direction of motion so that leading cutting edge portions of said tools machine before trailing cutting edge portions to thereby distribute machining forces over each cutting tool, and wherein the leading cutting edge portions of the cutting tools in one row are machiningly engaged with a bearing before the leading cutting edge portions of the cutting tools in the other row are machiningly engaged with another bearing to thereby further distribute machining forces during a machining operation.

19. The method set forth in claim 18 wherein said cutting tools are periodically changed by mounting said cutting tools on a generally horizontally reciprocating slide, mounting said slide on an upper platen slideably mounted on a lower platen, releasably fastening said upper platen to said lower platen during a machining operation, providing a bearing means at the interface between said upper platen and said lower platen, releasing said upper platen from said lower platen at the end of a machining operation and then sliding said upper platen on said bearing means horizontally on said lower platen and out of said lathe to thereby facilitate rapid removal of said cutting tools on upper platen from said machine.

20. The method set forth in claim 19 wherein after said upper platen with said cutting tools thereon is removed from said machine, a platen with new replacement cutting tools mounted thereon is in turn mounted on said machine by horizontally sliding said replacement tool platen onto said lower platen on said bearing means and then releasably fastening said replacement tool platen to said lower platen during a machining operation.

21. A method of machining crankshafts or the like having a plurality of bearings concentric about a common axis extending longitudinally of the shaft and including at least front and rear bearings at opposite ends thereof, comprising removably mounting a first plurality of at least eight to twelve individual disposable cutting tool inserts in a first row on a reciprocal slide, removably mounting at least eight to twelve individual disposable cutting tool inserts in a second row on said slide, said inserts being mounted on said slide so as to substantially optimize the distribution of machining forces during a machining operation by arranging and disposing the inserts to be progressively higher in a front-to-rear direction of slide so that machining forces are distributed between the inserts in each row, with the inserts having cutting edges inclined to the direction of travel of said slide to distribute machining forces over said cutting edges as they move progressively into a bearing, and with leading edges of the inserts in one row offset relative to leading edges of the inserts in the other row so as to distribute machining forces between the rows, and then supporting said shaft between a pair of spaced apart centers at opposite ends of said shaft, rotating said shaft on said axis by drivingly engaging said shaft at an end thereof and without drivingly engaging said shaft intermediate said front and rear main bearings, reciprocating said slide while said shaft is rotating to machiningly engage said inserts with said shaft and substantially simultaneously turn a plurality of bearings concentric to said axis while distributing cutting forces between the cutting tool inserts, and wherein said method further comprises sequentially machining a plurality of shafts until said inserts are to be periodically changed, removing said slide, removing worn inserts from said slide and replacing the worn inserts with new inserts and then remounting said slide and then machining a second plurality of shafts.

22. The method set forth in claim 21 wherein said inserts are periodically changed by mounting said slide on an upper platen slideably mounted on a horizontally reciprocating lower platen, releasably fastening said upper platen to said lower platen during a machining operation, providing bearing means at the interface between said upper platen and said lower platen, releasing said upper platen from said lower platen at the end of a machining operation and then sliding said upper platen on said bearing means horizontally on said lower platen and out of said lathe to thereby facilitate rapid removal of said cutting tool inserts from said machine.

23. The method set forth in claim 22 wherein after said upper platen with said cutting tool inserts thereon is removed from said machine, a platen with new replacement cutting tool inserts mounted thereon is in turn mounted on said machine by horizontally sliding said replacement tool plate onto said lower platen on said bearing means and then releasably fastening said replacement tool platen to said lower platen during a machining operation.

24. A lathe for use in machining a plurality of bearings on a shaft comprising a rotatable work holder means for rotatably supporting a shaft on a rotational axis, said shaft having front and rear bearings at opposite ends thereof, said rotatable work holder means including a first center at one end of said shaft and a second center at the other end of said shaft, at least one of said centers being a driven center and said lathe being free of any center drive chuck that drivingly engages said shaft intermediate of the front and rear main bearings, and a machine tool carrier having cutting tools mounted thereon with said carrier in turn being mounted on said machine for movement in a first direction to move said cutting tools tangentially across said shaft at a plurality of bearing locations, said cutting tools including a first plurality of cutting tools mounted on said carrier in a first row with cutting edges projecting toward said axis to machine a first bearing when said carrier moves in said first direction past said shaft, and a second plurality of cutting tools mounted on said carrier in a second row with cutting edges projecting toward said axis to machine a second bearing when said carrier moves in said first direction past said shaft, and wherein said cutting tools in said first and said second rows include removably mounted disposable inserts arranged and disposed relative to each other so as to distribute machining forces between each other as said cutting tools move across said shaft during a machining operation.

25. The lathe set forth in claim 24 wherein said first plurality of cutting tools and said second plurality of cutting tools each comprise at least about eight to twelve cutting tool inserts each of which is individually removably mounted.

26. The lathe set forth in claim 24 wherein said carrier includes an upper platen slideably mounted on a lower platen at an interface therebetween, said cutting tools inserts being mounted on said upper platen, means for releasably fastening said upper platen to said lower platen during a machining operation and bearing means at said upper and lower platen interface, said upper platen being slideable in a general horizontal direction so that when it is desirable to change the cutting tools, said upper platen with said tools being mounted thereon can be released from said lower platen and slideably removed therefrom on said bearing means and out of said lathe to facilitate rapid removal of said cutting tools.

27. The lathe set forth in claim 24 wherein said work holder means is arranged to support said shaft on a horizontal rotational axis and said machine tool carrier comprises a slide mounted on said machine for generally horizontally reciprocating movement under said shaft when said shaft is mounted in said work holder means.

28. The lathe set forth in claim 27 wherein said slide comprises an upper platen slideably mounted on a lower platen which in turn is mounted on said machine, said upper platen and lower platen having an interface therebetween and said cutting tool inserts being mounted on said upper platen, means for releasably fastening said upper platen to said lower platen during a machining operation and bearing means at said upper and lower platen interface, said upper platen being slideable in a general horizontal direction so that when it is desired to change the cutting tools, said upper platen with said tools being mounted thereon can be released from said lower platen and slideably removed therefrom on said bearing means and out of said lathe to facilitate rapid removal of said cutting tools.

29. The lathe set forth in claim 28 wherein said first and said second plurality of cutting tools are carried on said slide between opposite ends thereof and further comprising first shaft transfer means mounted on said slide at one end thereof for receiving a first shaft and transferring it between a first position remote from said work holder means and a second position at said work holder means when said slide moves between an extended position and a retracted position.

30. The lathe set forth in claim 27 wherein said first and said second plurality of cutting tools are carried on said slide between opposite ends thereof and further comprising first shaft transfer means mounted on said slide at one end thereof for receiving a first shaft and transferring it between a first position remote from said work holder means and a second position at said work holder means when said slide moves between an extended position and a retracted position.

31. A lathe set forth in claim 30 further comprising second shaft transfer means mounted on said slide at the other end thereof for receiving a second crankshaft and transferring it between said second position and a third position when said slide moves between said extended and retracted positions, said third position being remote from both said work holder means and said first position.

32. A method of machining shafts or the like having a plurality of bearings concentric about a common axis extending longitudinally of the shaft and including at least front and rear bearings at opposite ends thereof, comprising removably mounting a first plurality of individual disposable cutting tool inserts in a first row on a reciprocating slide, removably mounting a second plurality of individual disposable cutting tool inserts in a second row on said slide, said inserts being arranged and disposed on said slide so as to substantially optimize the distribution of machining forces between said cutting tool inserts during a machining operation, and then supporting said shaft between a pair of spaced apart centers at opposite ends of said shaft, rotating said shaft on said axis by drivingly engaging said shaft at an end thereof and without drivingly engaging said shaft intermediate said front and rear main bearings, reciprocating said slide while said shaft is rotating to machiningly engage said inserts with said shaft and substantially simultaneously turn a plurality of bearings concentric to said axis while distributing cutting forces between the cutting tool inserts, and wherein said method further comprises sequentially machining a plurality of shafts until said inserts are worn, removing said slide, removing the worn inserts from said slide and replacing the worn inserts with new inserts, remounting said slide with the new inserts thereon and then machining a second plurality of shafts with said new inserts.

33. A lathe for use in machining a plurality of bearings on a shaft comprising rotatable work holder means for rotatably supporting a shaft on a rotational axis and a machine tool carrier having cutting tools mounted thereon with said carrier in turn being mounted on said machine for movement in a first direction to move said cutting tools across said shaft at a plurality of bearing locations, said cutting tools including a first plurality of at least about eight to twelve individual disposable inserts removably mounted on said carrier in a first row with cutting edges projecting toward said axis to machine a bearing when said carrier moves in said first direction past said shaft and a second plurality of at least about eight to twelve individual disposable inserts removably mounted on said carrier in a second row with cutting edges projecting toward said axis to machine a second bearing when said carrier moves in said first direction, and wherein the cutting edges in each row at a trailing end of said carrier project deeper into said crankshaft than do the cutting edges at a leading end of said carrier to thereby distribute machining forces between the cutting edges in each row during a machining operation, the cutting edges in each row are inclined to said first direction to provide a leading cutting edge portion and a trailing cutting edge portion so that the cutting edges feed progressively into said bearings to thereby distribute cutting forces along said cutting edges, and wherein the leading cutting edge portions of the cutting tools in said first row are offset in the direction of travel of said carrier from the leading edge portions of the cutting tools in said second row so as to further distribute machining forces between the cutting tools in said first and second rows.

* * * * *